(12) United States Patent
Wong et al.

(10) Patent No.: US 11,122,464 B2
(45) Date of Patent: Sep. 14, 2021

(54) REAL-TIME LARGE VOLUME DATA CORRELATION

(71) Applicant: AT&T Intellectual Property I, L.P., Atlanta, GA (US)

(72) Inventors: Peter Aung Htut Wong, Newark, CA (US); Baofeng Jiang, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 50 days.

(21) Appl. No.: 16/552,729

(22) Filed: Aug. 27, 2019

(65) Prior Publication Data

US 2021/0068006 A1    Mar. 4, 2021

(51) Int. Cl.
| | |
|---|---|
| H04W 28/06 | (2009.01) |
| H04W 24/02 | (2009.01) |
| H04L 9/32 | (2006.01) |
| G06F 16/955 | (2019.01) |
| H04L 12/861 | (2013.01) |

(52) U.S. Cl.
CPC .......... *H04W 28/06* (2013.01); *G06F 16/955* (2019.01); *H04L 9/3242* (2013.01); *H04L 49/90* (2013.01); *H04W 24/02* (2013.01)

(58) Field of Classification Search
None
See application file for complete search history.

(56) References Cited

U.S. PATENT DOCUMENTS

| | | | | |
|---|---|---|---|---|
| 8,762,302 | B1 * | 6/2014 | Spivack | G06Q 50/01 706/12 |
| 8,874,266 | B1 * | 10/2014 | Francis, Jr. | G05B 23/0221 700/252 |
| 2010/0124239 | A1 * | 5/2010 | Hughes | H04L 69/04 370/477 |
| 2010/0131607 | A1 * | 5/2010 | Firminger | G06Q 30/02 709/206 |
| 2013/0227651 | A1 * | 8/2013 | Schultz | H04L 63/0861 726/4 |
| 2013/0310023 | A1 * | 11/2013 | Bevan | H04B 1/123 455/423 |
| 2014/0297821 | A1 * | 10/2014 | Lvin | H04L 41/064 709/223 |
| 2015/0088841 | A1 * | 3/2015 | Fuglsang | G06F 16/215 707/692 |
| 2016/0021070 | A1 * | 1/2016 | Wagner | H04L 63/0428 726/4 |

\* cited by examiner

*Primary Examiner* — Jamaal Henson

(57) ABSTRACT

A system and method uses a data correlator system to associate large volumes of related data. The data correlator system receives data packets with user content from a mobile network. The data correlator system creates a hash value for data associated with the user content, such as user account information or the location of the user device. The data correlator system uses the hash value to combine the user content with the associated data. The data correlator system provides the combined data to an optimization engine for optimizing the performance of the mobile network.

20 Claims, 10 Drawing Sheets

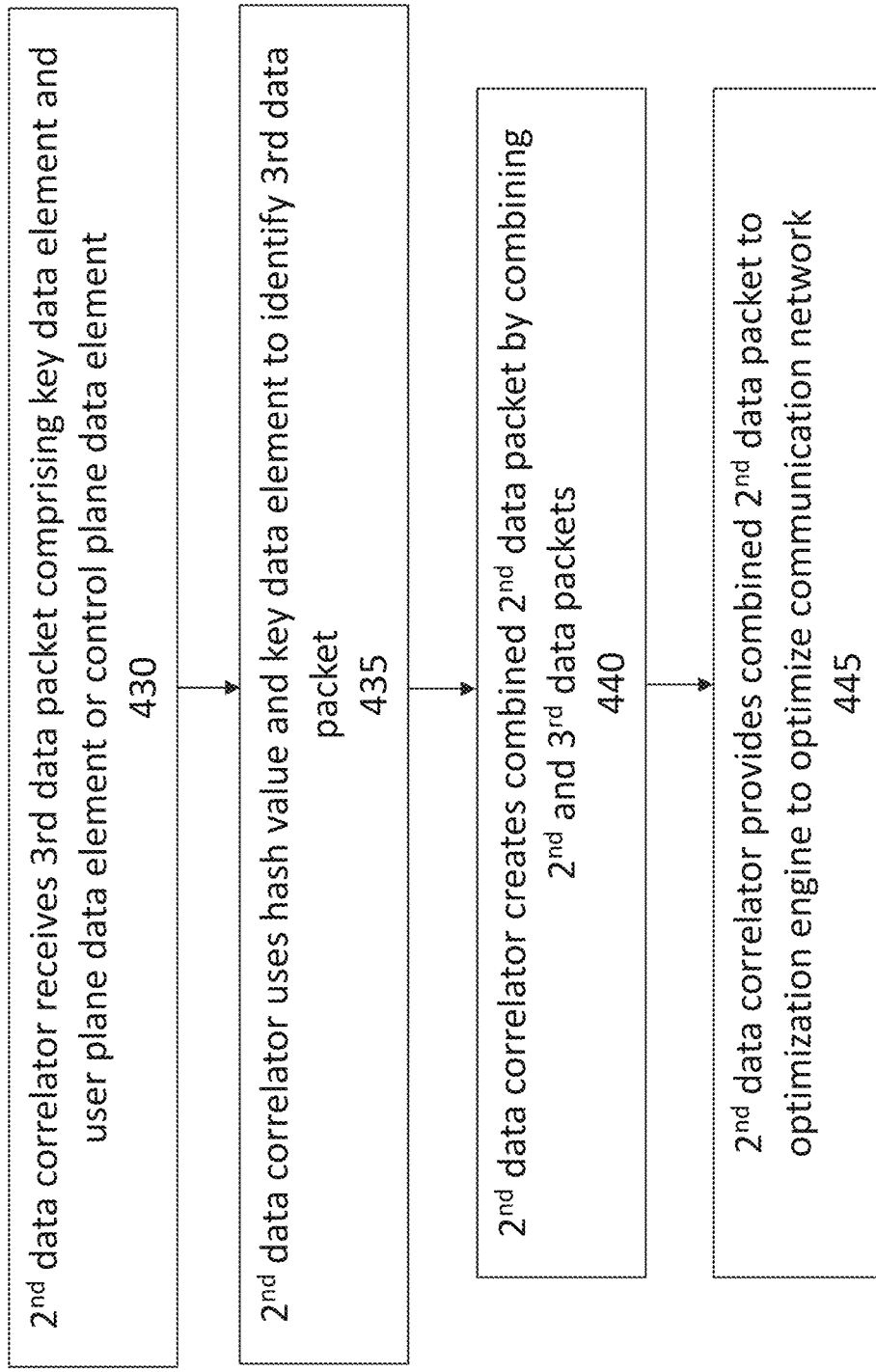

REAL-TIME LARGE VOLUME DATA CORRELATION

TECHNICAL FIELD

The present disclosure relates generally to systems and methods for correlating large volumes of data from a communication network.

BACKGROUND

As mobile devices such as cellular telephones, smart phones, and tablet computers continue to proliferate, the demands on communication networks continue to grow. For example, mobile network customers frequently access a variety of content, including text, images, and video using their mobile devices. This increased use of mobile devices has greatly increased the volume of data traffic handled by mobile networks. Techniques for optimizing the performance of the mobile network can assist the mobile network operator in handling increased volumes of data traffic. Optimizing the performance of the mobile network often requires quickly evaluating data associated with a particular content that a user is accessing over the mobile network. However, existing techniques for correlating data are not well-suited to handle large volumes of data. Additionally, existing techniques for correlating large volumes of data can be time consuming and can require substantial memory and processor resources. Accordingly, improved techniques for correlating large volumes of data associated with the data traffic on the mobile network can assist in improving the performance of the mobile network.

SUMMARY

One aspect of the present disclosure provides a system for correlating large volumes of data in connection with a communication network. The system comprises a communication network and a computing system, the computing system comprising the data correlator system. The computing system comprises a data correlator and a first data feed queue that supplies a first data packet from the communication network to the data correlator. The first data packet comprises a key data element, such as a device network identifier, and a user plane data element, such as a portion of one of an image, a video frame, or text, or a control plane data element, such as a network performance measurement, a key performance indicator, or a location of a user device. The computing system also comprises a data mapper and a second data feed queue that supplies a second data packet to the data mapper. The second data packet can comprise the key data element and a user identifier data element, such as a telephone number, an international mobile equipment identity (IMEI) code, an international mobile subscriber identity (IMSI) code, a name, or an account number. The data mapper creates a hash value for the second data packet. The data correlator uses the hash value and the key data element to identify the second data packet and create a combined data packet by combining the first data packet and the second data packet. The data correlator can provide the combined data packet to an optimization engine to optimize the functioning of the communication network.

Another aspect of the present disclosure provides a method for correlating large volumes of data in connection with a communication network. The method uses a data correlator executing on a computing system and the method comprises receiving a first data packet at the data correlator from a communication network, wherein the first data packet comprises a key data element and a user plane data element or a control plane data element. A data mapper executing on the computing system receives a second data packet which can comprise the key data element and a user identifier data element. The data mapper can create a hash value for the second data packet. The data correlator uses the hash value and the key data element to identify the second data packet and to combine the first data packet and second data packet to create a combined data packet. The data correlator can provide the combined data packet to an optimization engine to optimized the functioning of the communication network.

The foregoing aspects are example embodiments and are not meant to limit the scope of the present disclosure. These and other aspects will be described in connection with the following description and the accompanying drawings.

BRIEF DESCRIPTION OF THE DRAWINGS

FIG. 4B illustrates an alternate example method of a data correlator system in accordance with certain example embodiments.

DETAILED DESCRIPTION OF EXAMPLE EMBODIMENTS

Figure 1:
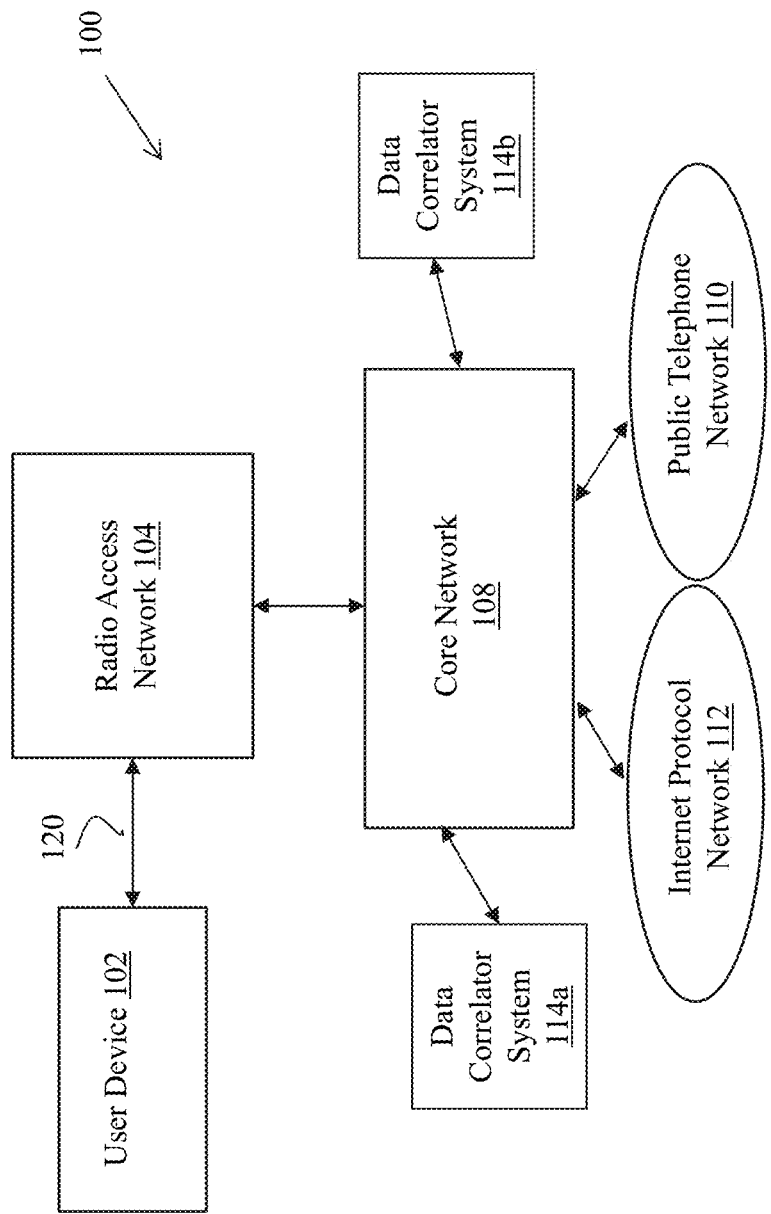
FIG. 1 is a block diagram illustrating an example communication network with data correlator systems in accordance with certain example embodiments.

The present disclosure relates generally to systems and methods for correlating large volumes of data in connection with optimizing the performance of a communication network. As one example, a user device receiving user content, such as video content, over the communication network may require transmission of a large number of data packets. In order to optimize the performance of the communication network, it may be desirable to hand off the user device from one cell to a neighboring cell within the communication network. In order to hand off the user device from one cell to another cell, the communication network may require certain information associated with the user device such as the device network identifier, the signal strength associated with the user device, the location of the user device, and the telephone number associated with the user device. These different pieces of information typically come from different sources. For example, the signal strength and the location of the user may be determined by the communication network. However, the telephone number associated with the user device may be retrieved from a separate database of user information.

In order to correlate the different pieces of information for network optimization decisions, the data correlator system can use common information among the different pieces of information. For example, data packets associated with each different piece of information include a key data element such as the device network identifier, an evolved Universal Terrestrial Radio Access Network (eUTRAN) device identifier, or a mobility management entity (MME) device identifier. The foregoing examples of identifiers are generally referred to herein as device network identifiers for simplicity. The data correlator can use the key data element associated with the data packets of each different piece of information to correlate and combine the related data.

As a further optimization, the data correlator system can rely on data mappers that create a hash value associated with the different pieces of information. It is common for communication networks today to have millions of simultaneous users and each of those users can be receiving large volumes of data over the communication network. In order to quickly correlate millions of data packets being transmitted over the communication network and to minimize the data processing and memory requirements for such correlation, the data correlation system relies on the data mappers and hash values to operate quickly and efficiently.

The foregoing example relating to handing off a user device from one cell to a neighboring cell of a communication network is only one example of the types of network optimization that can be performed. In other examples, decisions relating to optimization of the communication network can be based on the type of user device or the signal strength of the user device. For instance, if a user is watching a video with the user device in a region of the communication network that has limited bandwidth, the network can suggest that the user switch to a lower resolution of the video in order to improve delivery of the video content to the user device. Moreover, the data correlation techniques described herein can be used in other types of networks such as financial system networks.

Referring now to FIGS. 1-5, example embodiments in which the data correlator system can be implemented will be described. It should be understood that the example embodiments are intended to be non-limiting examples and that the data correlator system can be implemented in other systems. For example, in alternate embodiments, one of more of the components shown in the figures or described in the text may be eliminated, modified, or combined with another component.

FIG. 1 illustrates an example communication network 100 for a data correlator system, in accordance with example embodiments of the present disclosure. The communication network 100 can be any of a variety of communication networks handling large volumes of data. For example, the communication network 100 can be a cellular mobile radio network such as a Long Term Evolution (LTE) standard based cellular network, a 3G network, a 4G network, a 5G network, or another appropriate wireless network.

The communication network 100 may include an user device 102 that may be used by an end-user to communicate with the communication network using wireless services offered by the communication network 100. The end-user may be an individual user, a group of users, an enterprise or organizational entity, etc. As one example, in an LTE network, the user device 102 may be referred to as user equipment. However, in other networks, such as a 3G network, the user device 102 may be referred to as a mobile station. The user device 102 may include all user equipment and software needed for communication with the communication network 100. Examples of the user device 102 may include, but are not limited to, a smart phone, a cellular phone, a computer or laptop, a computing tablet, or any endpoint communication devices equipped with wireless capabilities. In some example embodiments, the user device 102 of the end-user may include a server, e.g., when the user is transmitting data for storage in a cloud server over the cellular network, or when the user is receiving streaming video content over the cellular network.

The user device 102 may access the wireless services offered by the communication network 100 via the radio access network 104. In particular, the user device 102 may wirelessly connect with the radio access network 104 over a wireless link 120, and the radio access network 104 may couple the user device 102 to other parts of the communication network, such as the core network 108. As an example, the radio access network of an LTE network may be an evolved Universal Terrestrial Radio Access Network (eUTRAN) that includes one or more evolved base stations. However, in other example communication networks, such as 3G, 4G, or 5G networks, the radio access network 104 may include base stations and/or base station controllers.

The radio access network 104 may transmit all the communication from the endpoint device 102 to the core network 108. The core network 108 of the communication network 100 may be responsible for the overall control of the actions requested by user device 102 that is wirelessly connected to the radio access network 104. For example, the core network 108 may be responsible for processing and routing the traffic (voice and/or data) from the user device 102 to other endpoint devices and/or external networks, such as Internet Protocol (IP) network 112 or public switched telephone network (PSTN) 110. Further, the core network 108 may also handle all the signaling in the control plane. For example, the core network 108 of an LTE network may be an Evolved Packet Core (EPC) that provides various functions that support wireless services in the LTE environment, e.g., as specified by the 3GPP standards. The EPC network may include at least a serving gateway (S-GW), a packet data network gateway (P-GW), and/or a mobility management entity (MME).

The MME is the control node that processes the signaling between the user device 102 and the core network 108. In particular, the functions of the MME may be categorized as a bearer function, such as, establishment, maintenance, and release of the bearers; and/or connection management functions, such as, establishment of the connection and security between the EPC and the user device 102. The S-GW may serve as a gateway that routes and forwards user data packets between the eUTRAN and the P-GW, while also acting as the mobility anchor for the user plane during handovers and as the anchor for mobility between LTE and other 3GPP technologies. The P-GW serves as a gateway that provides connectivity between the EPC and other external packet data networks. The P-GW may route data traffic to the IP network 112 and/or the PSTN 110 via an IMS network that includes a home subscriber server (HSS) database that is a central database that contains user-related and subscription-related information about all the network operator's subscribers (also referred to as users). The foregoing network components are merely examples and other communication networks can have other components.

Also illustrated in the example communication network 110 are data correlator systems 114a and 114b (referred to generally as 114). Although only two data correlator systems are shown in the example of FIG. 1, it should be understood that many data correlator systems can be distributed throughout the network to handle data correlation. Additionally, while the data correlator systems 114a and 114b are illustrated as in communication with the core network 108, in other embodiments data correlator systems can communicate with other components of the communication network 100.

Figure 2A:
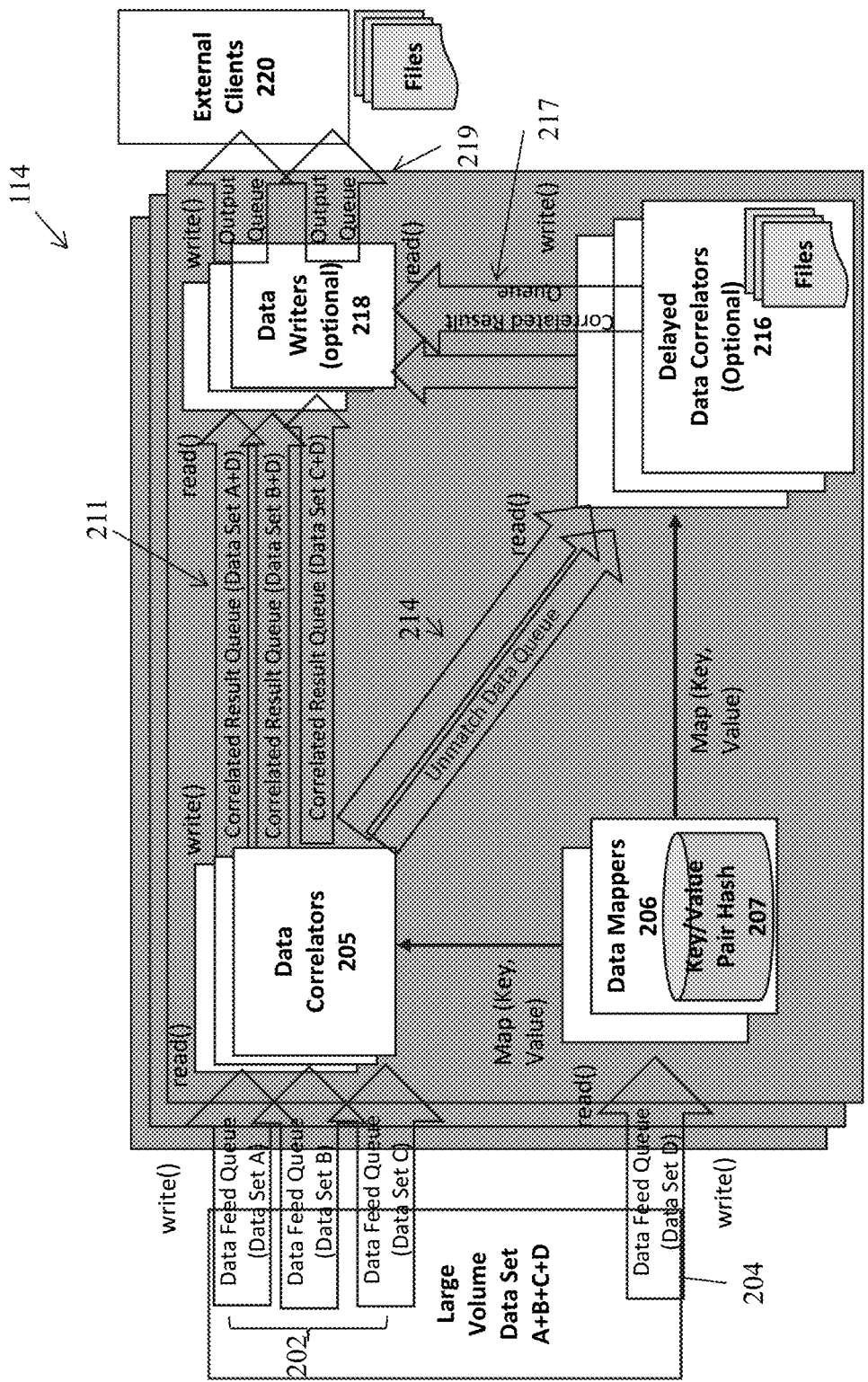
FIG. 2A illustrates an example data correlator system in accordance with certain example embodiments.

Referring now to FIG. 2A, an example data correlator system 114 is illustrated. The data correlator system can be implemented as a remote computing system or a collection of remote computing systems in a cloud computing environment. The example data correlator system 114 of FIG. 2A receives packets of data from the communication network 100 on data feed queues 202 and provides combined data packets in the form of correlated data via an output queue 219 to external clients 220, such as an optimization engine. The data correlator system 114 can also receive data packets from other sources, such as a database of subscriber information, as illustrated by data feed queue 204. The data feed queues 202 and 204 and output queue 219 can be implemented as any of a variety of network connections providing wired or wireless communication with the communication network 100 and other network components. In an example embodiment, the network connections of the data correlator system 114 can include one or more of a telecommunications network, a local area network (LAN), a wide area network (WAN), an intranet, an Internet, or any combination thereof. It will be appreciated that the network connections disclosed are examples and other means of establishing a communications link between the various network components can be used.

The data correlator system 114 of FIG. 2A further comprises one or more data correlators 205 in communication with one or more data mappers 206. Optionally, the data correlator system 114 can also include one or more delayed data correlators 216 and one or more data writers 218. The data correlator 205 receives sets of data packets in large volumes on the data feed queues 202. As one example, each data feed queue can provide a different type of data. For example, data set A can represent the user plane data and include data packets with user content data elements such as video or images the user is receiving at the user device 102. Data set B can represent the control plane data which can include data packets with network performance measurements, key performance indicators, or location of a user device. Data set C can represent the data plane which can include data packets associated with the location of the user device 102 within the network 100 such as the signal strength of the user device 102. Data set D represents a smaller volume of data than data sets A, B, and C. For example, data set D can comprise user identifier data elements containing the device network identifier associated with the user's device along with one other data element, such as a telephone number, an international mobile equipment identity (IMEI) code, an international mobile subscriber identity (IMSI) code, a name, or an account number. Additionally, the device network identifier is typically included in the data packets in data sets A, B, and C. Including the device network identifier in the data packets of data set D as well as the data packets of data sets A, B, and C provides a key data element common among the data packets associated with a user device and allows the data correlator 205 to correlate data packets.

The data mapper 206 receives data set D and creates a hash table enabling the data correlator 205 to more quickly identify and correlate data packets. The hash table will be explained further below in connection with FIGS. 3A, 3B, and 3C. The hash table can be stored in a key/value database 207. The key/value database 207 can include one or more tangible computer-readable storage devices. The computer-readable storage devices can be stored on or coupled to the data correlator system 114. For example, the computer-readable storage devices can include a hard drive, an on-board flash memory and/or one or more removable memory cards or removable flash memory. The computer-readable storage devices and their associated computer-readable media can provide non-transitory, non-volatile storage of the hash tables as well as other data structures or computer-executable instructions.

Once data packets are correlated, the data correlator can combine the data packets and provide them to external systems for use in optimizing the communication network 100. For example, an optional data writer 218 can write the combined data to files that can be used by a variety of external clients 220 that optimize the network. Alternatively, the data writer 218 and its associated files can be omitted and the data correlator 205 can provide correlated and combined data packets directly to an optimization engine. The combined data packets provide more complete information associated with the user device 102 thereby enabling the optimization engine to make optimization decisions.

One benefit of using the techniques of the data correlator and data mapper of FIG. 2A is that the large volumes of data packets received on the data feed queues 205 can be correlated and combined more quickly so that the optimization engine can provide real-time or near real-time optimizations to the communication network 100. As used herein, the term "real-time" refers to a user's perspective of the communication network and means that correlating data and making network optimization decisions can be completed within a few milliseconds to a few seconds, so that the network optimization appears to be happening in "real time" from the user's perspective. Aside from real-time optimization of the communication network 100, the combined data packets can also be stored for later analysis of historical network performance. Analyzing the historical network performance can be of value when enhancing or updating the communication network 100, for example.

The data correlator system 114 illustrated in FIG. 2A also includes an optional delayed data correlator 216. While the data correlator system 114 is designed to expedite the correlation and combination of associated data packets, in some instances, associated data packets could arrive at the data correlator system 114 at different times, thereby, preventing the data correlator 205 from quickly correlating and combining the data packets. For example, a first data packet comprising a device network identifier and video content could arrive on data feed queue A several seconds after a second related data packet comprising the same device network identifier and a telephone number arrives on data feed queue D. Due to the difference in time, the data correlator 205 may be unable to correlate and combine the two data packets. In this situation, the data mapper forwards the second data packet to the delayed data correlator 216 and, when it arrives, the data correlator 205 forwards the first data packet to the delayed data correlator 216. The delayed data correlator works to correlate and combine related data packets that arrived at different times. Although the delayed combined data packet may be too late to assist with real-time optimization, it still can be stored for later analysis of historical network performance.

Figure 2B:
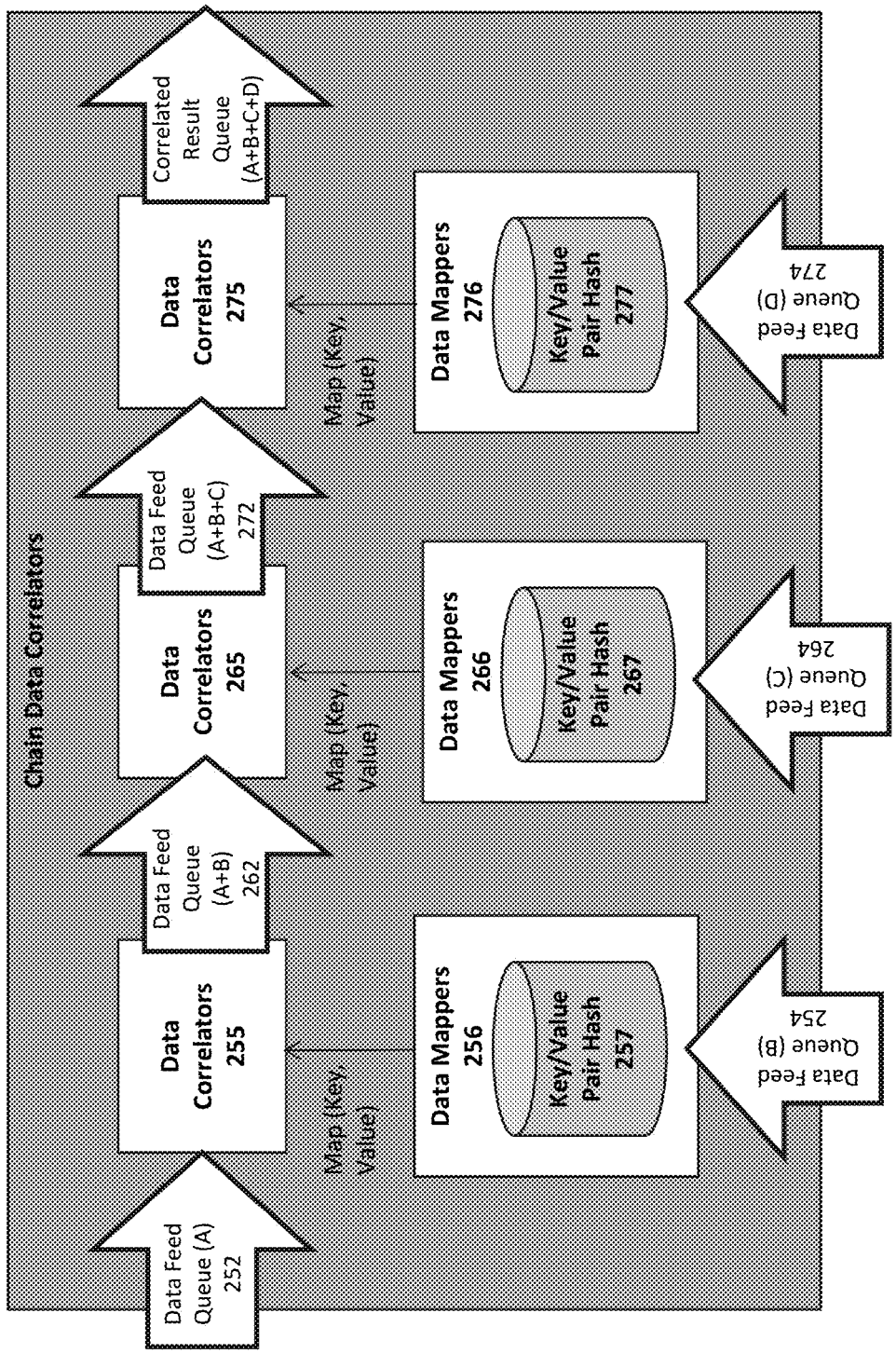
FIG. 2B illustrates an alternate example of a data correlator system in accordance with certain example embodiments.

Referring now to FIG. 2B, an alternate embodiment of a data correlator system 114 is illustrated. Similar to the data correlator 114 illustrated in FIG. 2A, the data correlator 114 illustrated in FIG. 2B is implemented in a computer system and comprises data queues 252, 262, and 272 which provide data packets to and receive data packets from data correlators 255, 265, and 275. The data correlator system 114 of FIG. 2B also comprises data mappers 256, 266, and 276 associated with key/value databases 257, 267, and 277, respectively. The foregoing components of the data correlator system 114 of FIG. 2B operate in a similar manner to their counterpart components described in connection with FIG. 2A. However, the system of FIG. 2B implements a chain data correlation approach. That is, after data correlator 255 combines a first data packet from queue A and a second data packet from queue B, the combined data packet is sent to data correlator 265 where it is combined with a third related data packet from queue C. After data correlator 265 combines the third data packet with the first and second data packets, the combined data packet is sent to data correlator 275 where it is combined with a fourth related data packet from queue D. Therefore, the combined data packet provided to the output queue 279 is the combination of four related data packets and provides more complete information about the data transmitted than one of the combined data packets of FIG. 2A which only included two data packets.

Figure 3A:
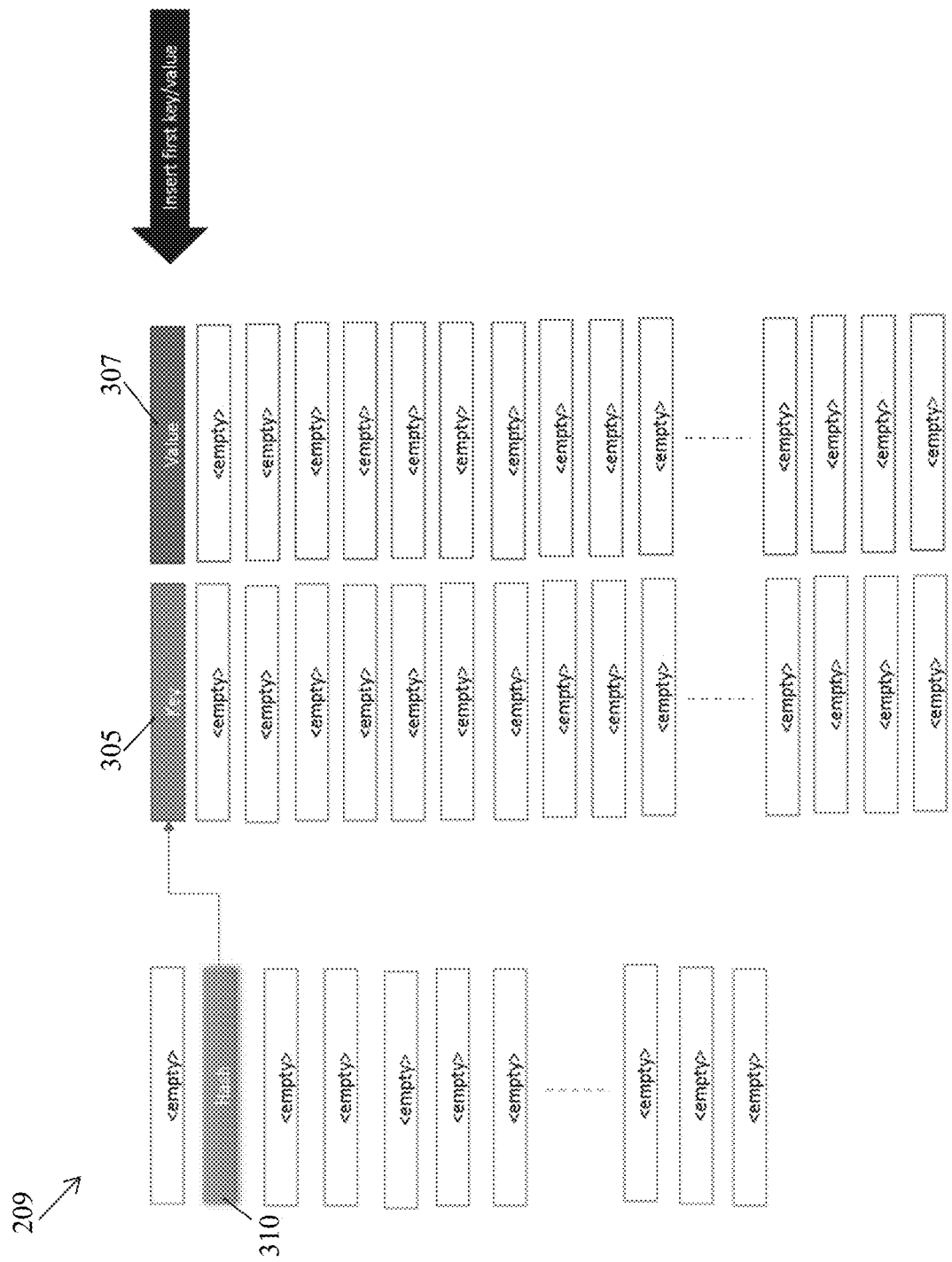
FIGS. 3A, 3B, and 3C illustrate example hash tables used with a data correlator system in accordance with certain example embodiments.

While components of the data correlator systems 114 illustrated in FIGS. 2A and 2B are implemented in software, such as the data correlator, the data mapper, the optional delayed data correlator, the optional data writer, and the external client, it will be appreciated that one or more acts or functions of the data correlator system 114 may be performed by hardware, software, or a combination thereof, and may be embodied in one or more computing systems. It should be understood that the data correlator, the data mapper, the optional delayed data correlator, the optional data writer, and the external client can include various routines, sub-routines, programs, objects, components, data structures, etc., which perform particular tasks or implement particular abstract data types Referring now to FIGS. 3A, 3B, and 3C, an example of a hash table 209 is illustrated. The hash table is stored in the key/value databases such as those illustrated in FIGS. 2A and 2B. One goal of the hash table 209 is to store data packets efficiently so that they do not require excessive memory and processing resources. As illustrated in FIG. 3A, the hash table 209 is empty and the first data packet received at the data mapper is stored in the fields at the top of the hash table. The key 305 represents a key data element in the received first data packet, such as a device identifier associated with the user device 102. The value 307 represents another data element in the received first data packet, such as a telephone number, an international mobile equipment identity (IMEI) code, an international mobile subscriber identity (IMSI) code, a name, or an account number associated with the user device. The hash value 310 is a condensed version of the key 305. In its condensed form, the hash value 310 provides a faster mechanism for the data correlator to correlate the received first data packet with a related data packet received on another data feed queue.

Figure 3B:
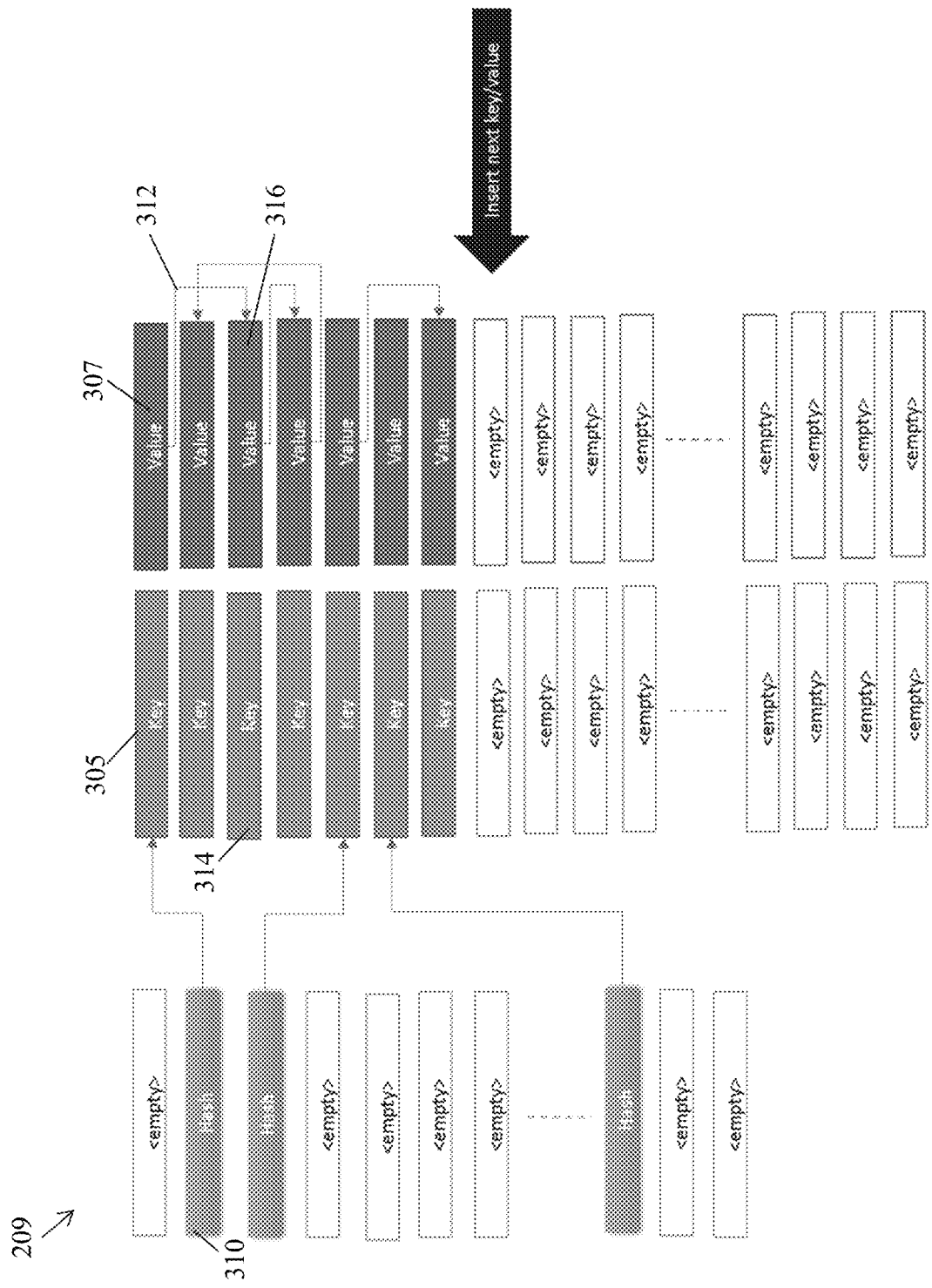

Referring to FIG. 3B, the hash table 209 is now shown populated with data from multiple data packets that have been received by the data mapper. As illustrated in the example of FIG. 3B, data from newer data packets arriving at the data mapper is inserted in fields below the older data so that older packet data remains at the top of the hash table 209. FIG. 3B shows that because the hash value is a condensed version of the key, it is possible for different user devices to have the same hash value. In the example of FIG. 3B, key 305 and key 314 can represent device network identifiers for different user devices, but they have the same hash value because the hash value is a condensed version of the key. When this occurs, the data in the key and value fields is linked by link 312. When the data correlator receives the hash value 310 associated with two different user devices, the data correlator will examine the key in fields 305 and 314 in order to correctly identify the data packet.

Figure 3C:
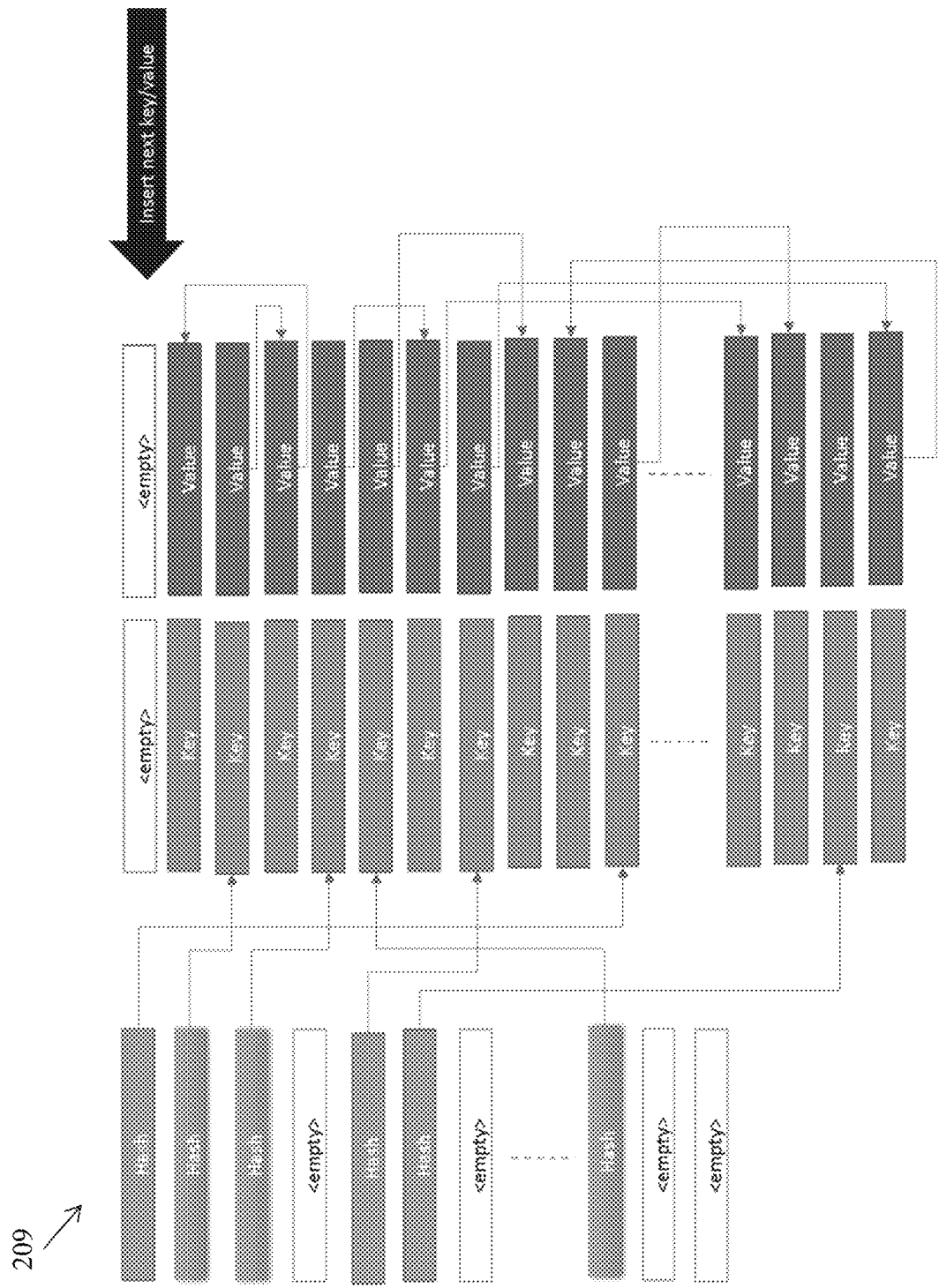

FIG. 3C illustrates when the hash table 209 becomes full with packet data and hash values due to the volume of data packets received at the data mapper. Given the goal of minimizing memory resources, the hash table 209 is limited to a fixed size. Accordingly, when the hash table 209 becomes full, a key and value data associated with a newly received data packet will overwrite the oldest packet data at the top of the hash table 209.

Figure 4A:
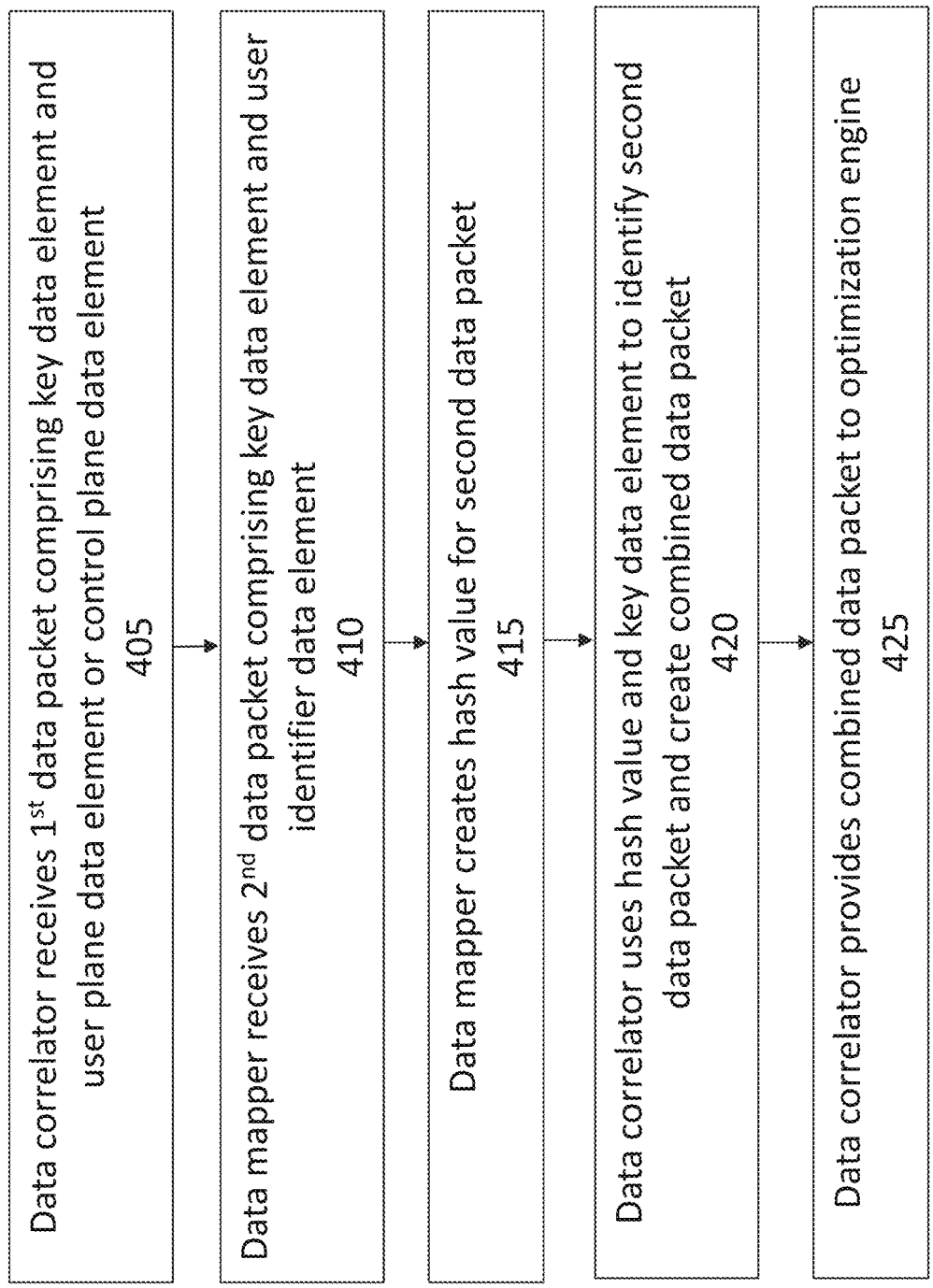
FIG. 4A illustrates an example method of a data correlator system in accordance with certain example embodiments.
Figure 4C:
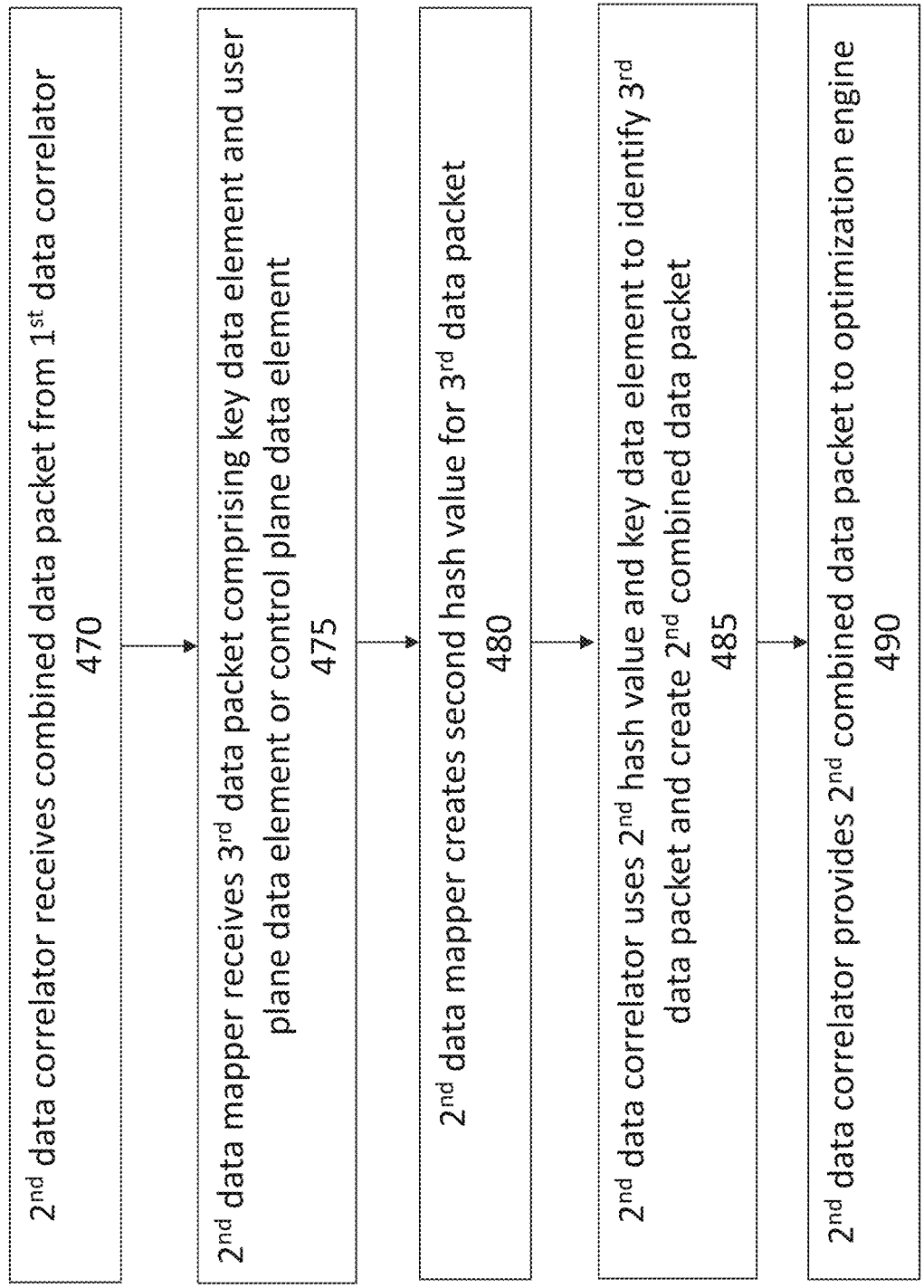
FIG. 4C illustrates yet another alternative example method of a data correlator system in accordance with certain example embodiments.

Referring now to FIGS. 4A, 4B, and 4C, example flow charts are shown depicting methods for correlating data using the data correlator systems 114 of FIGS. 1-3C. It should be understood that in other example embodiments, the example methods of FIGS. 4A, 4B, and 4C can be modified to combine certain steps, add steps, or modify the order of certain steps. Referring to step 405 of FIG. 4A, the data correlator receives on a data feed queue a first data packet comprising a key data element and at least one of a user plane data element or a control plane data element. As mentioned previously, the key data element can be a device network identifier associated with the user device 102. The user plane data element can be, for example, a portion of a video frame being transmitted to the user device 102. The control plane data element can be a network performance measurement, a key performance indicator, or a location of a user device. In step 410, the data mapper of the data correlator system 114 receives a second data packet that is related to the first data packet in that the second data packet has the same key data element (e.g., device network identifier) as well as a user identifier data element comprising one of a telephone number, a name, or an account number. In step 415, the data mapper creates a hash value for the second data packet and stores the hash value and the key and value of the second data packet in a hash table in a key/value database. In step 420, the data correlator receives the hash value from the hash table and uses the hash value and the key data element to identify the second data packet. The data correlator can then combine the first data packet and the second data packet into a combined data packet. In step 425, the data correlator provides the combined data packet to an optimization engine so that the optimization engine can use the data of the combined packets to make network optimization decisions and recommendations. Without the combination of the data from the two data packets, the optimization engine will be less able to make effective network optimization decisions and recommendations.

As illustrated in FIG. 2A, the data correlation system 114 can comprise multiple data feed queues providing a variety of data packets to multiple data correlators. FIG. 4B illustrates an alternative example with multiple data correlators. The alternative example of FIG. 4B can build upon the example of FIG. 4A. In other words, the steps of the example method illustrated in 4B can take place in parallel with the steps of the example method illustrated in FIG. 4A. Beginning with step 430 of FIG. 4B, a second data correlator receives a third data packet on a third data feed queue. The third data packet comprises the same key data element of the first and second data packets of FIG. 4A as well as one of the user plane data element or the control plane data element that was absent from the first data packet. In other words, if the first data packet included the key data element and the user plane data element, the third data packet can comprise the key data element and the control plane data element. It should be understood that in alternate examples, the third data packet could comprise other information such as information from the data plane of the communication network. In step 435, the second data correlator can use the same hash value referenced in FIG. 4A and the key data element to identify the third data packet and, in step 440, combine it with the related second data packet having the same key data element. In step 445, the second data correlator provides the combined second data packet (a combination of the second data packet and the third data packet) to the network optimization engine for use in optimizing the communications network 100.

In contrast to the parallel method illustrated in FIG. 4B, FIG. 4C shows the chain data correlation approach illustrated in FIG. 2B. The method illustrated in FIG. 4C can begin after step 420 in FIG. 4A and before the combined data packet is forwarded to the optimization engine. In step 470, a second data correlator receives from the first data correlator the combined data packet that was created in step 420 of FIG. 4A. In step 475, a second data mapper receives a third data packet comprising the same key data element of the first and second data packets as well as one of the user plane data element or the control plane data element that was absent from the first data packet. In other words, if the first data packet included the key data element and the user plane data element, the third data packet can comprise the key data element and the control plane data element. It should be understood that in alternate examples, the third data packet could comprise other information such as information from the data plane of the communication network. In step 480, the second data mapper creates a second hash value for the third data packet. In step 485, the second data correlator uses the second hash value and the key data element to identify the third data packet as related to the first and second data packets. The second data correlator combines the third data packet with the first and second data packets to create a second combined data packet. Lastly, in step 490, the second data correlator provides the second combined data packet to the optimization engine for use in optimizing the communication network. Alternatively, the second data correlator could provide the second combined data packet to yet another data correlator for combining additional data.

The components of the example communication network 100 have been described with reference to the example systems and methods illustrated in FIGS. 1-4C. The example embodiments can include one or more computer programs that embody the functions described herein and illustrated in the appended flow charts. However, it should be apparent that there could be many different ways of implementing aspects of the example embodiments in computer programming, and these aspects should not be construed as limited to one set of computer instructions. Further, a skilled programmer would be able to write such computer programs to implement example embodiments based on the figures and associated description in the application text. Therefore, disclosure of a particular set of program code instructions is not considered necessary for an adequate understanding of how to make and use the example embodiments. Those skilled in the art will appreciate that one or more acts described may be performed by hardware, software, or a combination thereof, as may be embodied in one or more computing systems. Furthermore, those having ordinary skill in the art and the benefit of the present disclosure will appreciate that the foregoing payment network components can have any of several other suitable computer system configurations.

The example embodiments described herein can be used with computer hardware and software that perform the methods and processing functions described previously. The systems, methods, and procedures described herein can be embodied in a programmable computer, computer-executable software, or digital circuitry. The software can be stored on tangible computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 5:
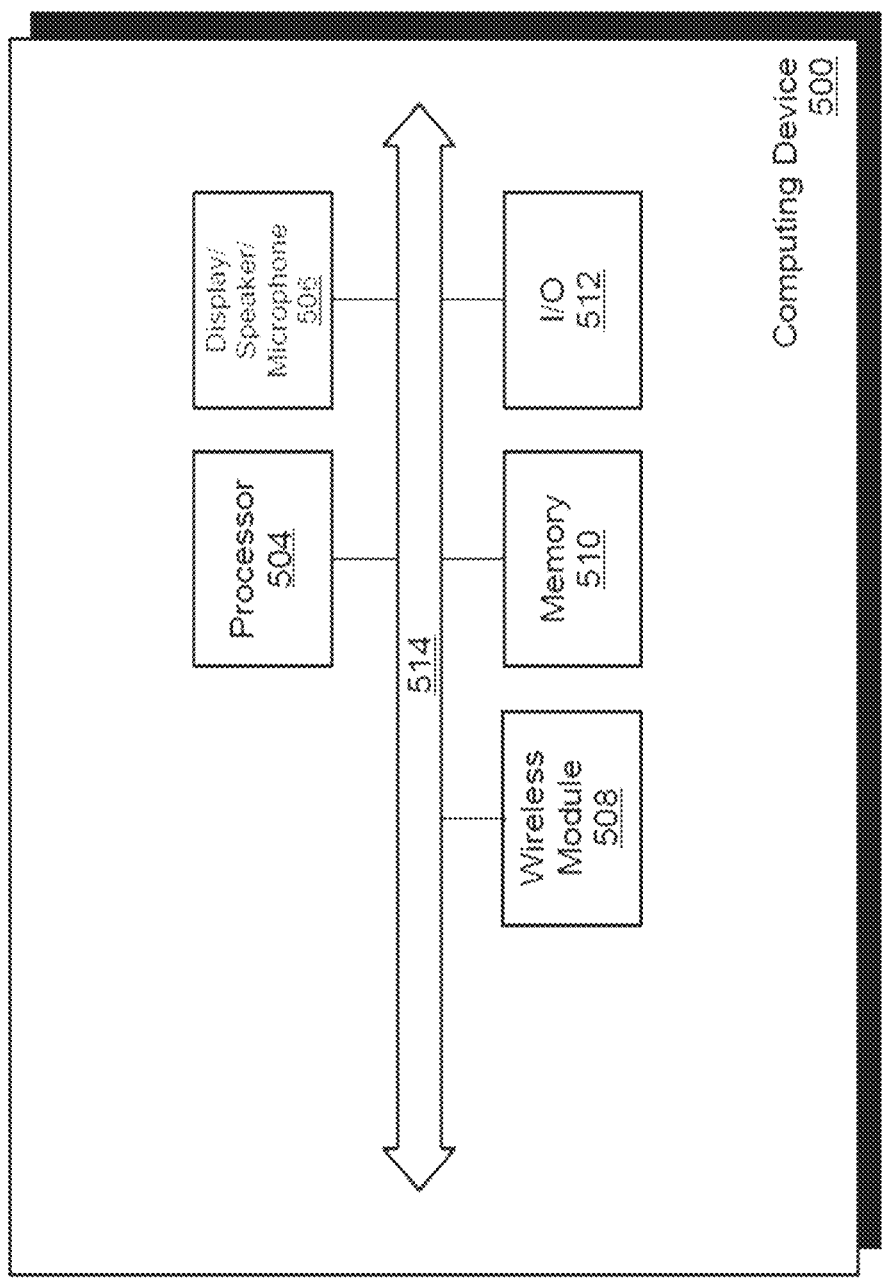
FIG. 5 is an example embodiment of a functional block diagram of a computing system for hosting a data correlator system in accordance with certain example embodiments.

FIG. 5 illustrates an example block diagram of a computing system 500 such as the computing system hosting the data correlator system 114 described previously. As illustrated in FIG. 5, the computing device includes a hardware processor 504, display/speaker/microphone 506, wireless module 508, memory 510, and I/O 512. In FIG. 5, elements of the computing device 500 are electrically and communicatively interconnected via a bus 514.

The processor 504 may comprise one or more specific or general purpose processors configured to execute instructions stored on the memory 510 that, when executed, control the processor 504 to execute various applications and perform various functions associated with the computing device 500. Additionally or alternatively, the processor 504 may include a programmable gate array and operate, at least in part, based on firmware. As an example, the processor 504 may execute instructions stored on the memory 510 including instructions for an operating system of the computing device 500 and instructions for applications. The applications that may be executed by the computing device 500 include mobile applications and engines, data mapping and data correlation processing applications, network optimization applications, an e-mail application, a map viewer application, and a web-browser application, among others. The input commands control applications executing on the computing device 500 to perform various tasks or functions associated with the applications.

The display/speaker/microphone 506 is configured to display applications executing on the processor 504 and provide visual and audible feedback to a user of the computing device 500. To that end, the display/speaker/microphone 506 may comprise one or more display devices such as LCD, LED, OLED, and Electronic Ink displays, among others. The display/speaker/microphone 506 may also comprise one or more speakers and one or more microphones.

The wireless communication module 508 is configured to provide wireless communication of data to and from the computing device 500. As a non-limiting group of examples, the wireless communication module 508 may be configured for cellular communications using one or more of GSM, CDMA, TDMA, OFDM and other cellular communications protocols, wireless area network communications using one or more of the family of 802.11x protocols and other wireless area network communications protocols, and Bluetooth communications protocols.

The memory 510 may comprise a Random Access Memory (RAM), Read Only Memory (ROM), or any other tangible storage memory configured to store software programs for execution by the processor 504. As a non-limiting example group, the memory 510 may comprise one or more of dynamic, persistent, and semi-persistent solid state memories, magnetic memories, removable memories, or any other known memories suitable for the application of storing data and software programs for the computing device 500.

The I/O 512 includes inputs and outputs of the computing device 500 such as power connectors, data connectors, and other input and output devices. The I/O 512 may comprise, for example, wired data communication input and output interfaces, power charging interfaces, infra-red interfaces, light and proximity sensors, capacitive sensors, "soft" and "hard" buttons, switches, and other input/output interfaces of the computing device 500. The bus 514 is configured to electrically and communicatively connect the processor 504, the display/speaker/microphone 506, the wireless module 508, the memory 510, and the I/O 512 for transfer of data and instructions between elements of the computing device 500.

The example methods and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computing system comprising:
   a data correlator;
   a first data feed queue that supplies a first data packet from a communication network to the data correlator, wherein the first data packet comprises a key data element and a user plane data element or a control plane data element;
   a data mapper; and
   a second data feed queue that supplies a second data packet to the data mapper, wherein the second data packet comprises the key data element and a user identifier data element,
   wherein the data mapper creates a hash value for the second data packet;
   wherein the data correlator uses the hash value and the key data element to identify the second data packet and combines the first data packet and the second data packet to create a combined data packet comprising the user identifier data element and the user plane data element or the control plane data element; and
   wherein the data correlator provides the combined data packet to an optimization engine for optimizing a functioning of the communication network.

2. The computing system of claim 1, wherein the key data element is a device network identifier.

3. The computing system of claim 1, wherein the user plane data element comprises a portion of: one of an image, a video frame, and text.

4. The computing system of claim 1, wherein the user identifier data element comprises one of: a telephone number, an international mobile equipment identity code, an international mobile subscriber identity code, a name, or an account number.

5. The computing system of claim 1, wherein the user identifier data element is retrieved from a user database that is separate from the communication network.

6. The computing system of claim 1, wherein the optimization engine uses the control plane data element and a device network identifier of the key data element to identify a first cell location of a device associated with the device network identifier and to transfer the device to a second cell location within the communication network.

7. The computing system of claim 1, wherein the computing system further comprises:
   a second data correlator; and
   a third data feed queue that supplies a third data packet to the second data correlator, wherein the third data packet comprises the key data element and one of the user plane data element or the control plane data element that is absent from the first data packet;
   wherein the second data correlator uses the hash value and the key data element to identify the third data packet and to combine the third data packet and the second data packet to create a combined second data packet comprising the user identifier data element and the one of the user plane data element or the control plane data element that is absent from the first data packet; and
   wherein the second data correlator provides the combined second data packet to the optimization engine to optimize the functioning of the communication network.

8. The computing system of claim 1, further comprising:
   a second data correlator; and
   a second data mapper;
   wherein the second data correlator receives the combined data packet from the data correlator;
   wherein the second data mapper receives a third data packet, wherein the third data packet comprises the key data element and one of the user plane data element or the control plane data element that is absent from the first data packet;
   wherein the second data mapper creates a second hash value for the third data packet;
   wherein the second data correlator uses the second hash value and the key data element to identify the third data packet and to combine the combined data packet and the third data packet to create a second combined data packet comprising the user identifier data element, the user plane data element, and the control plane data element; and
   wherein the second data correlator provides the second combined data packet to the optimization engine to optimize the functioning of the communication network.

9. The computing system of claim 8, wherein the control plane data element comprises one of: a network performance measurement or location data.

10. The computing system of claim 1, further comprising a delayed data correlator, wherein the delayed data correlator:
    receives the first data packet from the data correlator when the data correlator is unable to combine the first data packet and the second data packet;
    receives the hash value from the data mapper;
    uses the hash value and the key data element to identify the second data packet and to combine the first data packet received from the data correlator and the second data packet received at the data mapper to create a delayed combined data packet comprising the user identifier data element and the user plane data element or the control plane data element; and provides the delayed combined data packet to the optimization engine to optimize the functioning of the communication network.

11. A method comprising:

receiving, from a communication network, a first data packet at a data correlator, wherein the first data packet comprises a key data element and a user plane data element or a control plane data element, and wherein the data correlator executes on a computing system; and receiving a second data packet at a data mapper, the data mapper executing on the computing system, wherein the second data packet comprises the key data element and a user identifier data element;

creating, by the data mapper, a hash value for the second data packet;

identifying, by the data correlator, the second data packet by using the hash value and the key data element;

combining, by the data correlator, the first data packet and the second data packet to create a combined data packet comprising the user identifier data element and the user plane data element or the control plane data element; and providing the combined data packet to an optimization engine for optimizing a functioning of the communication network.

12. The method of claim 11, wherein the key data element is a device network identifier.

13. The method of claim 11, wherein the user plane data element comprises a portion of one of: an image, a video frame, and text.

14. The method of claim 11, wherein the user identifier data element comprises one of: a telephone number, an international mobile equipment identity code, an international mobile subscriber identity code, a name, or an account number.

15. The method of claim 11, wherein the user identifier data element is retrieved from a user database that is separate from the communication network.

16. The method of claim 11, wherein the optimization engine uses the control plane data element and a device network identifier of the key data element to identify a first cell location of a device associated with the device network identifier and to transfer the device to a second cell location within the communication network.

17. The method of claim 11, further comprising:

receiving a third data packet at a second data correlator, wherein the third data packet comprises the key data element and one of the user plane data element or the control plane data element that is absent from the first data packet;

identifying, by the second data correlator, the third data packet by using the hash value and the key data element;

combining, by the second data correlator, the second data packet and the third data packet to create a combined second data packet comprising the user identifier data element and the one of the user plane data element or the control plane data element that is absent from the first data packet; and providing, by the second data correlator, the combined second data packet to the optimization engine to optimize the functioning of the communication network.

18. The method of claim 11, further comprising:

receiving, at a second data correlator, the combined data packet from the data correlator;

receiving, at a second data mapper, a third data packet, wherein the third data packet comprises the key data element and one of the user plane data element or the control plane data element that is absent from the first data packet;

creating, by the second data mapper, a second hash value for the third data packet;

identifying, by the second data correlator, the third data packet by using the second hash value and the key data element;

combining, by the second data correlator, the combined data packet and the third data packet to create a second combined data packet comprising the user identifier data element, the user plane data element, and the control plane data element; and providing, by the second data correlator, the second combined data packet to the optimization engine to optimize the functioning of the communication network.

19. The method of claim 18, wherein the control plane data element comprises one of: a network performance measurement or location data.

20. The method of claim 11, further comprising:

receiving, at a delayed data correlator, the first data packet from the data correlator when the data correlator is unable to combine the first data packet and the second data packet;

receiving, at the delayed data correlator, the hash value from the data mapper;

identifying, by the delayed data correlator, the second data packet by using the hash value and the key data element;

combining, by the delayed data correlator, the first data packet and the second data packet to create a delayed combined data packet comprising the user identifier data element and the user plane data element or the control plane data element; and providing, by the delayed data correlator, the delayed combined data packet to the optimization engine to optimize the functioning of the network.

* * * * *